(12) United States Patent
Sekiya

(10) Patent No.: US 7,057,136 B2
(45) Date of Patent: Jun. 6, 2006

(54) FINISHING MACHINE USING LASER BEAM

(75) Inventor: Kazuma Sekiya, Tokyo (JP)

(73) Assignee: Disco Corporation, Tokyo (JP)

( * ) Notice: Subject to any disclaimer, the term of this patent is extended or adjusted under 35 U.S.C. 154(b) by 12 days.

(21) Appl. No.: 10/483,122

(22) PCT Filed: Apr. 28, 2003

(86) PCT No.: PCT/JP03/05441

§ 371 (c)(1),
(2), (4) Date: Jan. 8, 2004

(87) PCT Pub. No.: WO03/095140

PCT Pub. Date: Nov. 20, 2003

(65) Prior Publication Data

US 2004/0195223 A1 Oct. 7, 2004

(30) Foreign Application Priority Data

May 13, 2002 (JP) .............................. 2002-137028

(51) Int. Cl.
*B23K 26/00* (2006.01)

(52) U.S. Cl. .......................... 219/121.84; 219/121.86; 219/121.6

(58) Field of Classification Search ........... 219/121.84, 219/121.86, 121.6
See application file for complete search history.

(56) References Cited

U.S. PATENT DOCUMENTS

| 3,866,398 | A |   | 2/1975  | Vernon, Jr. et al. |
|-----------|---|---|---------|---------------------|
| 4,149,062 | A |   | 4/1979  | Limmer et al. |
| 4,303,824 | A |   | 12/1981 | Morgan et al. |
| 4,752,668 | A | * | 6/1988  | Rosenfield et al. .... 219/121.68 |
| 4,897,520 | A | * | 1/1990  | Carter et al. ........... 219/121.68 |
| 5,133,689 | A |   | 7/1992  | Aalto et al. |
| 5,319,183 | A | * | 6/1994  | Hosoya et al. ......... 219/121.68 |
| 5,922,225 | A | * | 7/1999  | Blake ..................... 219/121.84 |
| 6,326,590 | B1 |  | 12/2001 | Shaffer et al. |

FOREIGN PATENT DOCUMENTS

| DE | 42 10 518 A1 | 10/1993 |
|----|--------------|---------|
| FR | 2 764 530 A  | 6/1997  |
| JP | 61-286086 A  | 12/1986 |
| JP | 4-364088     | 12/1992 |
| JP | 5-123886     | 5/1993  |

* cited by examiner

*Primary Examiner*—M. Alexandra Elve
(74) *Attorney, Agent, or Firm*—Smith, Gambrell & Russell, LLP

(57) ABSTRACT

A machining device comprises workpiece holding means for holding a workpiece, laser beam machining means for shining a laser beam to the workpiece held by the workpiece holding means to machine the workpiece, and moving means for moving the workpiece held by the workpiece holding means, and a laser beam shone to the workpiece relative to each other. Suction means is disposed for sucking from a machining region where the laser beam is shone to the workpiece. The suction means includes a central hood, a central suction source for sucking through the central hood, an outer hood, and an outer suction source for sucking through the outer hood, and the suction force of the central suction source is greater than the suction force of the outer suction source.

5 Claims, 4 Drawing Sheets

FINISHING MACHINE USING LASER BEAM

TECHNICAL FIELD

This invention relates to a machining device for shining a laser beam to a workpiece to machine the workpiece. More specifically, the invention relates to, but is not limited to, a machining device suitable for removing a low dielectric constant insulator, laminated on the face of a semiconductor wafer, along predetermined lines.

BACKGROUND ART

In the manufacture of semiconductor chips, as is well known among people skilled in the art, a plurality of rectangular regions are defined on the face of a semiconductor wafer by streets arranged in a lattice pattern, and a semiconductor circuit is formed in each of the rectangular regions. This semiconductor wafer is cut along the streets to separate the rectangular regions individually, thereby forming semiconductor chips. For cutting along the streets, a machining device called a dicer is usually used. Such a machining device comprises workpiece holding means for holding a workpiece, namely, a semiconductor wafer, cutting means for cutting the semiconductor wafer held by the workpiece holding means, and moving means for moving the workpiece holding means and the cutting means relative to each other. The cutting means includes a rotatably mounted spindle, a cutting blade mounted on the spindle, and a rotational drive source for rotating the spindle. As the cutting blade, there is advantageously used a thin disk-shaped blade, called a diamond blade, which can be formed by binding diamond grains with a nickel plating or a suitable bond, such as a resin bond.

In recent times, a semiconductor wafer having a low dielectric constant insulator laminated on the face of a semiconductor wafer body, such as a silicon wafer, has been put to practical use. Examples of the low dielectric constant insulator are films of materials having a lower dielectric constant (e.g., dielectric constant k=about 2.5 to 3.6) than that of an $SiO_2$ film (k=about 4.1), for example, a film of an inorganic material such as SiOF, BSG (SiOB) or H-containing polysiloxane (HSQ), a film of an organic material, such as a polyimide-based or parylene-based or polytetrafluoroethylene-based polymer film, and a porous silica film comprising methyl-containing polysiloxane or the like. Assume that such a semiconductor wafer is cut with the aforementioned machining device called a dicer, that is, cut by the action of the cutting blade called a diamond blade. In this case, there is a tendency toward the occurrence of the impermissible event that a surface layer, i.e. a low dielectric constant insulator layer, peels off the semiconductor wafer body even in regions adjacent to the streets, owing to the marked brittleness of the low dielectric constant insulator. Thus, before cutting of the semiconductor wafer by the machining device called a dicer, it is attempted to remove the low dielectric constant insulator by shining a laser beam to the streets.

However, when a laser beam is shone to the semiconductor wafer as the workpiece, thereby removing the low dielectric constant insulator, the following problem has been found to occur: Melt refuse (i.e. debris) from the low dielectric constant insulator, which is formed by shining of the laser beam, scatters and adheres to the surface of the rectangular region of the semiconductor wafer. As a result, the semiconductor circuit tends to be contaminated.

DISCLOSURE OF THE INVENTION

Therefore, a principal object of the present invention is to provide a novel and improved machining device which effectively suppresses or avoids a situation where debris formed by shining of a laser beam scatters and adheres to the face of a workpiece.

We, the inventors of the present invention, conducted in-depth studies, and have found that if suction means is disposed for sucking from a machining region where a laser beam is shone to a workpiece, the situation that the resulting debris scatters and adheres to the face of the workpiece is effectively suppressed or avoided.

According to the present invention, as a machining device capable of attaining the above object, there is provided a machining device comprising: workpiece holding means for holding a workpiece; laser beam machining means for shining a laser beam to the workpiece held by the workpiece holding means to machine the workpiece; and moving means for moving the workpiece held by the workpiece holding means, and a laser beam shone to the workpiece relative to each other, and characterized in that suction means is disposed for sucking from a machining region where the laser beam is shone to the workpiece.

Preferably, the suction means includes a central hood, a central suction source for sucking through the central hood, an outer hood, and an outer suction source for sucking through the outer hood, and the suction force of the central suction source is greater than the suction force of the outer suction source. The laser beam machining means preferably includes a laser beam shining head located opposite the workpiece held by the workpiece holding means, the central hood surrounds the laser beam shining head, and the outer hood surrounds the central hood. The laser beam shining head preferably includes laser beam shining means for shining a laser beam to the workpiece held by the workpiece holding means, and an inert gas jetting nozzle surrounding the laser beam shining means. Alternatively, the laser beam machining means can include a laser beam shining head located opposite the workpiece held by the workpiece holding means, the central hood can have a suction opening located unilaterally of the laser beam shining head, and the outer hood can have suction openings located bilaterally of the suction opening of the central hood. The central suction opening and the outer suction openings preferably extend arcuately around the laser beam shining head.

BEST MODE FOR CARRYING OUT THE INVENTION

The present invention will now be described in greater detail by reference to the accompanying drawings which illustrate the preferred embodiments of a machining device constructed in accordance with the present invention.

Figure 1:
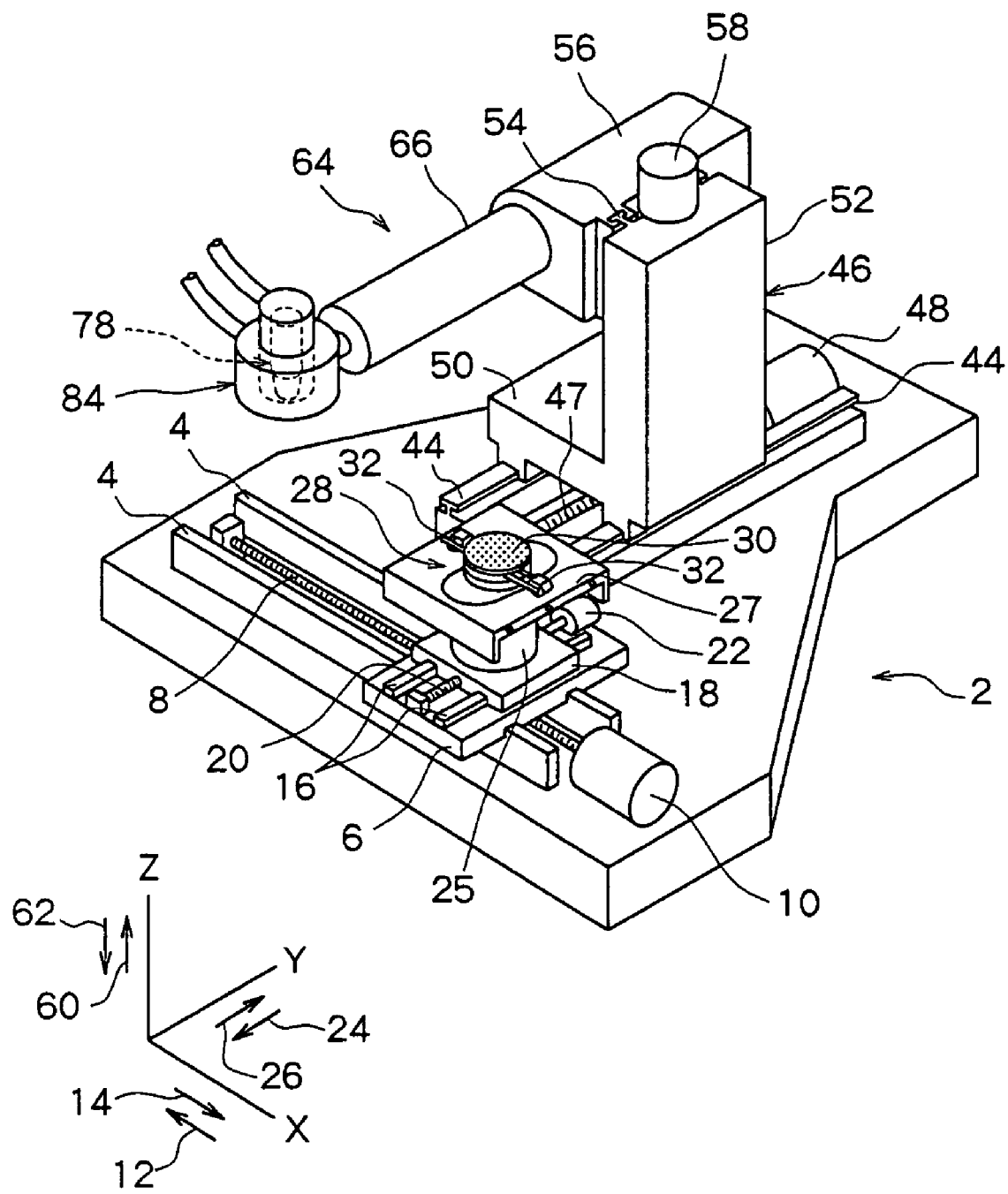
FIG. 1 is a perspective view showing main constituent elements in a preferred embodiment of a machining device constructed according to the present invention.

FIG. 1 shows a principal portion of a preferred embodiment of the machining device constructed according to the present invention. The illustrated machining device has a support plate 2, and a pair of guide rails 4 extending in an X-axis direction are disposed on the support plate 2. A first slide block 6 is mounted on the guide rails 4 so as to be movable in the X-axis direction. A threaded shaft 8 extending in the X-axis direction is rotatably mounted between the pair of guide rails 4, and an output shaft of a pulse motor 10 is connected to the threaded shaft 8. The first slide block 6 has a downward portion (not shown) extending downwardly, and an internally threaded hole piercing in the X-axis direction is formed in the downward portion. The threaded shaft 8 is screwed to the internally threaded hole. Thus, when the pulse motor 10 is rotated in a normal direction, the first slide block 6 is moved in a direction indicated by an arrow 12. When the pulse motor 10 is rotated in a reverse direction, the first slide block 6 is moved in a direction indicated by an arrow 14. As will become apparent from descriptions to be given later, the pulse motor 10 and the threaded shaft 8 rotated thereby constitute moving means for moving a workpiece (relative to laser beam machining means).

A pair of guide rails 16 extending in a Y-axis direction are disposed on the first slide block 6. A second slide block 18 is mounted on the guide rails 16 so as to be movable in the Y-axis direction. A threaded shaft 20 extending in the Y-axis direction is rotatably mounted between the pair of guide rails 16, and an output shaft of a pulse motor 22 is connected to the threaded shaft 20. An internally threaded hole piercing in the Y-axis direction is formed in the second slide block, and the threaded shaft 20 is screwed to the internally threaded hole. Thus, when the pulse motor 22 is rotated in a normal direction, the second slide block 18 is moved in a direction indicated by an arrow 24. When the pulse motor 22 is rotated in a reverse direction, the first slide block 18 is moved in a direction indicated by an arrow 26. A support table 27 is fixed to the second slide block 18 via a cylindrical member 25, and holding means 28 is also mounted on the second slide block 18 via the cylindrical member 25. The holding means 28 is mounted so as to be rotatable about a central axis extending substantially vertically. A pulse motor (not shown) for rotating the holding means 28 is disposed within the cylindrical member 25. The holding means 28 in the illustrated embodiment is composed of a chuck plate 30 formed from a porous material, and a pair of gripping means 32.

Figure 2:
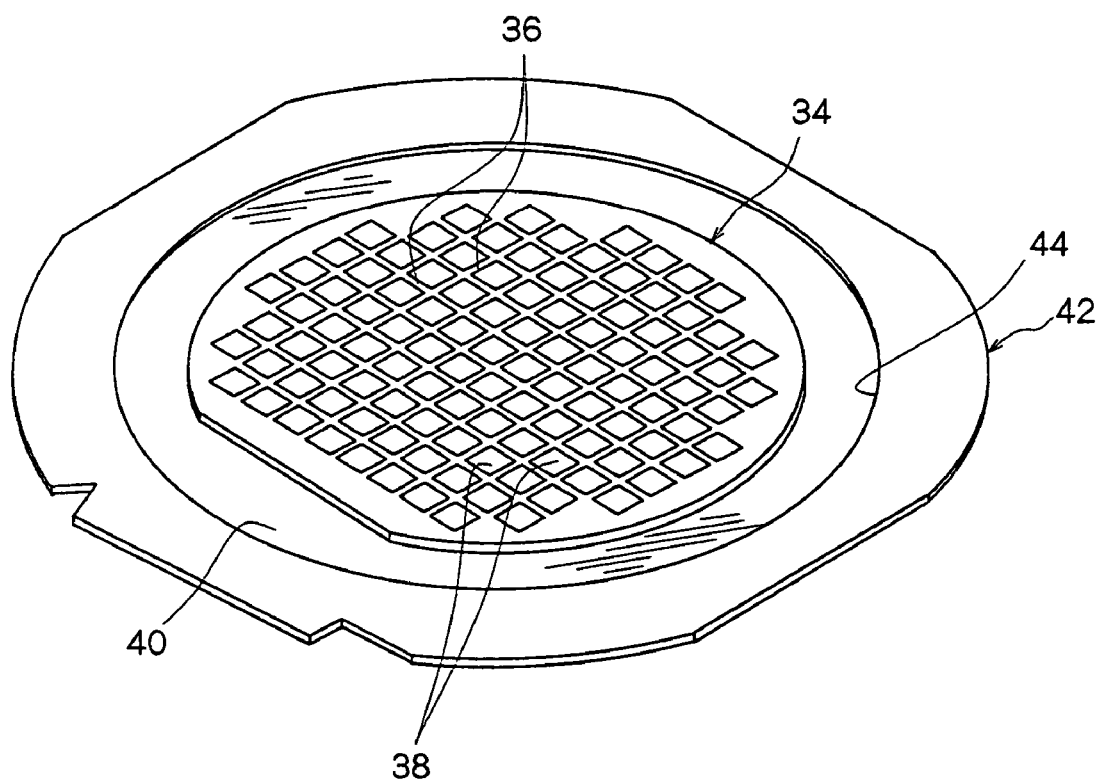
FIG. 2 is a perspective view showing an example of a semiconductor wafer which is a workpiece.

FIG. 2 shows a semiconductor wafer 34 which is a workpiece. The semiconductor wafer 34 is of a form having a low dielectric constant insulator laminated on the face of a semiconductor wafer body such as a silicon wafer. Streets 36 are formed in a lattice pattern on this face, and a plurality of rectangular regions 38 are demarcated by the streets 36. A semiconductor circuit is formed in each of the rectangular regions 38. In the illustrated embodiment, the semiconductor wafer 34 is mounted on a frame 42 via a mounting tape 40. The frame 42, which can be formed from a suitable metal or synthetic resin, has a relatively large circular opening 44 at the center, and the semiconductor wafer 34 is positioned in the opening 44. The mounting tape 40 extends on lower surfaces of the frame 42 and the semiconductor wafer 34 across the opening 44 of the frame 42, and is stuck to the lower surfaces of the frame 42 and the semiconductor wafer 34. In machining the semiconductor wafer 34, the semiconductor wafer 34 is located on the chuck plate 30 in the holding means 28, and the chuck plate 30 is brought into communication with a vacuum source (not shown), whereby the semiconductor wafer 34 is vacuum attracted onto the chuck plate 30. The pair of gripping means 32 of the holding means 28 grip the frame 42. The holding means 28 itself, and the semiconductor wafer 34 itself mounted on the frame 42 via the mounting tape 40 may be in forms well known among people skilled in the art, and thus detailed explanations for them will be omitted herein.

Referring to FIG. 1 again, a pair of guide rails 44 extending in the Y-axis direction are disposed on the support plate 2. A third slide block 46 is mounted on the pair of guide rails 44 so as to be movable in the Y-axis direction. A threaded shaft 47 extending in the Y-axis direction is rotatably mounted between the pair of guide rails 44, and an output shaft of a pulse motor 48 is connected to the threaded shaft 47. The third slide block 46 is nearly L-shaped, and has a horizontal base portion 50, and an upright portion 52 extending upwardly from the horizontal base portion 50. The horizontal base portion 50 has a downward portion (not shown) extending downwardly, and an internally threaded hole piercing in the Y-axis direction is formed in the downward portion. The threaded shaft 47 is screwed to the internally threaded hole. Thus, when the pulse motor 48 is rotated in a normal direction, the third slide block 46 is moved in the direction indicated by the arrow 24. When the pulse motor 48 is rotated in a reverse direction, the third slide block 46 is moved in the direction indicated by the arrow 26.

A pair of guide rails 54 (only one of them is shown in FIG. 1) extending in a Z-axis direction are disposed on one side surface of the upright portion 52 of the third slide block 46. A fourth slide block 56 is mounted on the pair of guide rails 54 so as to be movable in the Z-axis direction. A threaded shaft (not shown) extending in the Z-axis direction is rotatably mounted on one side surface of the third slide block 46, and an output shaft of a pulse motor 58 is connected to the threaded shaft. A protrusion (not shown) projecting toward the upright portion 52 is formed in the fourth slide block 56, and an internally threaded hole piercing in the Z-axis direction is formed in the protrusion. The above-mentioned threaded shaft is screwed to this internally threaded hole. Thus, when the pulse motor 58 is rotated in a normal direction, the fourth slide block 56 is moved in a direction indicated by an arrow 60, namely, upward. When the pulse motor 58 is rotated in a reverse direction, the fourth slide block 56 is moved in a direction indicated by an arrow 62, namely, downward.

Figure 3:
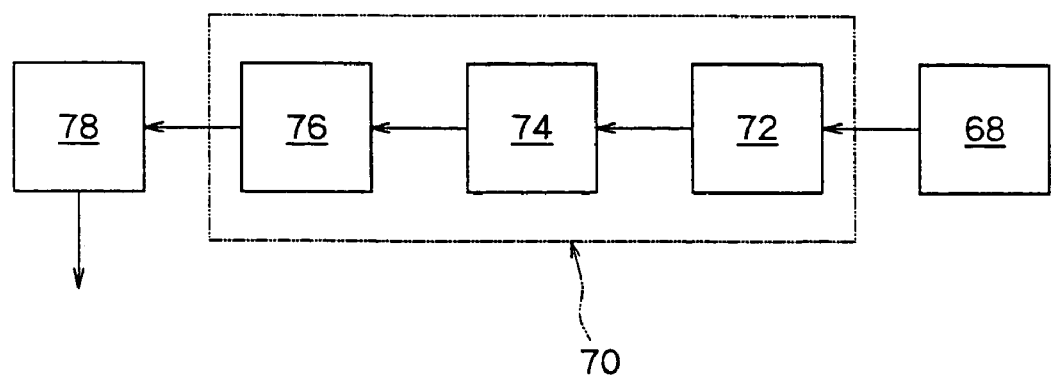
FIG. 3 is a diagrammatic view schematically showing the constitution of laser beam machining means in the machining device of FIG. 1.

Laser beam machining means, indicated entirely at a numeral 64, is mounted on the fourth slide block 56. The illustrated laser beam machining means 64 includes a casing 66 of a cylindrical shape fixed to the fourth slide block 56 and extending forward (i.e. in the direction indicated by the arrow 26) substantially horizontally. Further with reference to FIG. 3 along with FIG. 1, laser beam oscillation means 68 and laser beam modulation means 70 are disposed within the casing 66. The laser beam oscillation means 68 is advantageously a YAG laser oscillator or a YVO4 laser oscillator. The laser beam modulation means 70 includes pulse repetition frequency setting means 72, laser beam pulse width setting means 74, and laser beam wavelength setting means 76. The pulse repetition frequency setting means 72, laser beam pulse width setting means 74, and laser beam wavelength setting means 76 constituting the laser beam modulation means 70 may be of forms well known among people skilled in the art, and thus detailed explanations for their constitutions are omitted herein. A laser beam shining head 78 is mounted at the front end of the casing 66.

A laser beam oscillated by the laser beam oscillation means 68 arrives at laser beam shining means 78 via the laser beam modulation means 70. In the laser beam modulation means 70, the pulse repetition frequency setting means 72 converts the laser beam into a pulse laser beam of a predetermined pulse repetition frequency, the laser beam pulse width setting means 74 sets the pulse width of the pulse laser beam at a predetermined width, and the laser beam wavelength setting means sets the wavelength of the pulse laser beam at a predetermined value. It is preferred that the pulse width of the pulse laser beam is 1,000 ps (picoseconds) or less, particularly 1 to 500 ps. If the pulse width is too large, the semiconductor wafer 34 irradiated with the laser beam tends to be heated to a considerably high temperature and melted. The pulse repetition frequency is preferably 0.01 to 100 KHZ. The wavelength of the pulse laser beam is preferably 200 to 600 nm.

Figure 4:
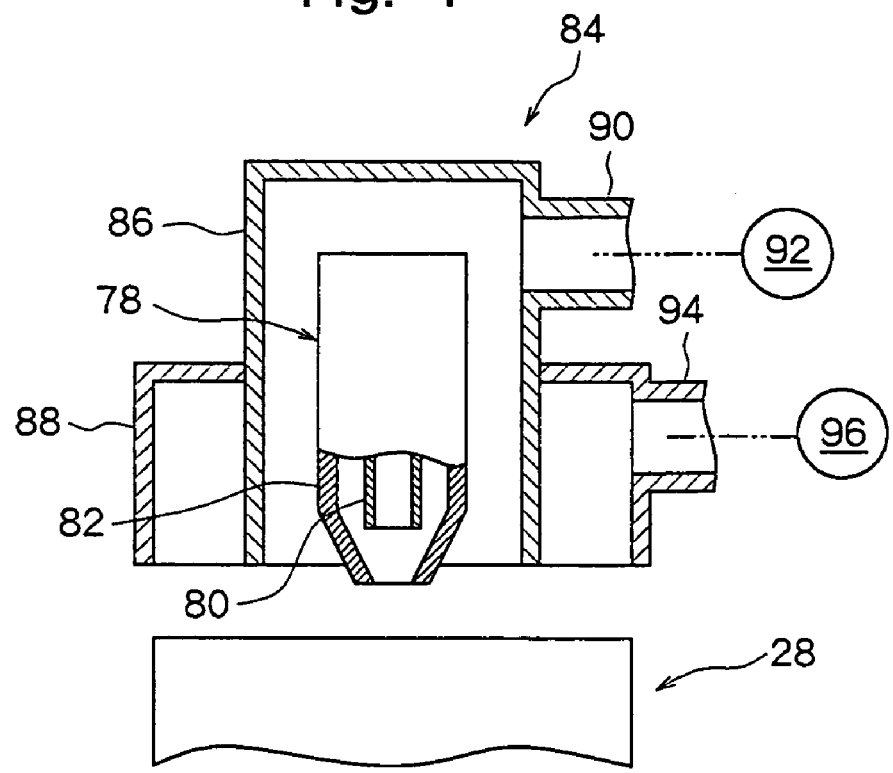
FIG. 4 is a longitudinal sectional view showing a laser beam shining head and suction means in the machining device of FIG. 1.

Referring to FIG. 4 along with FIG. 1, the laser beam shining head 78 fixed to the front end of the casing 66 is located opposite the workpiece, i.e. the semiconductor wafer 34, held on the holding means 28. The laser beam shining head 78 includes laser beam shining means 80 for shining a laser beam to the semiconductor wafer 36 as the workpiece, and an inert gas jetting nozzle 82 surrounding the laser beam shining means 80. The jetting nozzle 82 has a cylindrical main portion concentrically surrounding the laser beam shining means 80, and a tapered front end portion extending beyond the front end of the laser beam shining means 80. A suitable inert gas, such as a nitrogen gas, is fed to the jetting nozzle 82 through a suitable feed pipe (not shown), and such an inert gas is jetted toward the semiconductor wafer 34 as the workpiece.

In the machining device constructed in accordance with the present invention, it is important that suction means 84 be disposed for sucking from a machining region where a laser beam is shone to the workpiece held on the holding means 28, namely, from a site on the face of the workpiece, i.e. the semiconductor wafer 34, held by the holding means 28. The suction means 84 in the illustrated embodiment has a central hood 86 and an outer hood 88. The central hood 86 is a nearly cylindrical hood surrounding the laser beam shining head 78, with a lower surface of the central hood 86 being open, and an upper surface thereof being closed. The outer hood 88 is a nearly cylindrical hood surrounding a lower part of the central hood 86, with a lower surface of the outer hood 88 being open, and an upper surface thereof being closed. A circular opening is formed at the center of a top wall closing the upper surface of the outer hood 88, and the central hood 86 extends through this circular opening. A suction pipe 90 is annexed to the central hood 86, and the suction pipe 90 is connected to a central suction source 92 which may be a vacuum pump. Similarly, a suction pipe 94 is annexed to the outer hood 88, and an outer suction source 96 which may be a vacuum pump is connected to the suction pipe 94. Preferably, the suction force of the central suction source 92 is greater than the suction force of the outer suction source 96; therefore, a central portion of the machining region is sucked with a relatively great suction force, while a peripheral edge portion of the machining region is sucked with a relatively small suction force. Most of debris, immediately after melting, is sucked with the relatively great suction force that acts through the central hood 86. The remaining debris is sucked with the suction force that acts through the outer hood 88. Thus, the sucking actions of the suction sources 92 and 96 can be effectively used without being rendered unnecessarily strong.

Figure 5:
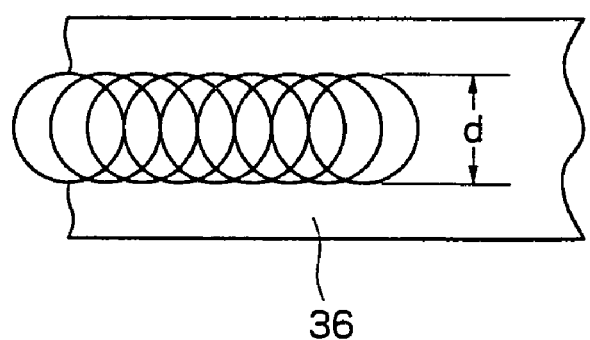
FIG. 5 is an abridged diagrammatic view schematically showing a pulse laser beam shone to a street when the semiconductor wafer is machined by the machining device of FIG. 1.

In the above-described machining device, the laser beam, which has been modulated, as required, by the laser beam modulation means 70 and has arrived at the laser beam shining means 80, is shone to the semiconductor wafer 34 held on the holding means 28. In further detail, according to the illustrated embodiment, the position of the street 36 of the semiconductor wafer 34 held on the holding means 28 is detected sufficiently accurately by suitable alignment means (not shown), whereby the holding means 28 is positioned with respect to the laser beam shining means 80 so that the laser beam shot downward from the laser beam shining means 80 will reach a particular street 36. With the pulse laser beam being shone toward the semiconductor wafer 34 from the laser beam shining means 80, the holding means 28, accordingly the semiconductor wafer 34 held thereby, is moved at a predetermined speed in the direction, for example, indicated by the arrow 12. Thus, the pulse laser beam is shone along the specific street 36, whereby the low dielectric constant insulator laminated on the surface of the particular street 36 is removed. As shown in FIG. 5, the spot diameter, d, of the pulse laser beam shone onto the street 36 of the semiconductor wafer 34 is preferably of the order of 5 to 100 μm. Preferably, the moving speed of the semiconductor wafer 34 is of the order of 1 to 1,000 mm/second, and the number of overlaps of the spots of the pulse laser beam shone to the street 36 is about 2 to 5. That is, it is preferred for the pulse laser beam to be shone to the street 36 repeatedly, two to five times. If the number of overlaps of the spots of the pulse laser beam is too small, the low dielectric constant insulator is removed insufficiently. If the number of overlaps is too large, on the other hand, the semiconductor wafer 34 tends to be heated excessively.

After the semiconductor wafer 34 is moved in the direction indicated by the arrow 12 to complete the removal of the low dielectric constant insulator in the particular street 36, the holding means 28, accordingly the semiconductor wafer 34, is indexed by the spacing between the streets 36 in the direction indicated by the arrow 26 (or 24). Then, the holding means 28, accordingly the semiconductor wafer 34, is moved in the direction indicated by the arrow 14, with the pulse laser beam being shone to the next street 36. Thus, the low dielectric constant insulator on the next street 36 is removed. After the low dielectric constant insulator on all the streets 36 extending in the particular direction has been removed in this manner, the holding means 28, accordingly the semiconductor wafer 34, is turned 90 degrees. Then, the low dielectric constant insulator on the streets 36 extending perpendicularly to the aforementioned particular direction is removed similarly. In the illustrated embodiment, when the pulse laser beam is shone to the street 36 of the semiconductor wafer 34, the semiconductor wafer 34 held by the holding means 28 is moved. If desired, however, the laser beam shining means 80 can be moved instead. Alternatively, instead of indexing the semiconductor wafer 34 held by the holding means 28, the laser beam shining means 80 can be indexed. However, the movement of the laser beam shining means 80 may result in poor accuracy because of vibrations. Thus, it is preferred that the laser beam shining means 80 is kept stationary, and the holding means 28, accordingly the semiconductor wafer 34 held thereby, is moved as desired.

In the illustrated embodiment, when the laser beam is shone along the street 36 of the semiconductor wafer 34 to remove the low dielectric constant insulator, as described earlier, the inert gas is jetted from the jetting nozzle 82 toward the face of the semiconductor wafer 34. Furthermore, the machining region, namely, the site on the face of the semiconductor wafer 34, is sucked through the central hood 86 and the outer hood 88. Thus, melt refuse, i.e. debris, from the low dielectric constant insulator, which is formed by shining of the laser beam, is thrust away by the energy of the laser beam. The debris is also thrown off the face of the semiconductor wafer 34 by a jet of the inert gas. Then, the debris is sucked through the central hood 86 or the outer hood 88. Thus, the situation that the debris adheres to the surface on the rectangular region 38 of the semiconductor wafer 34 to contaminate the semiconductor circuit is effectively prevented or suppressed.

Figure 6:
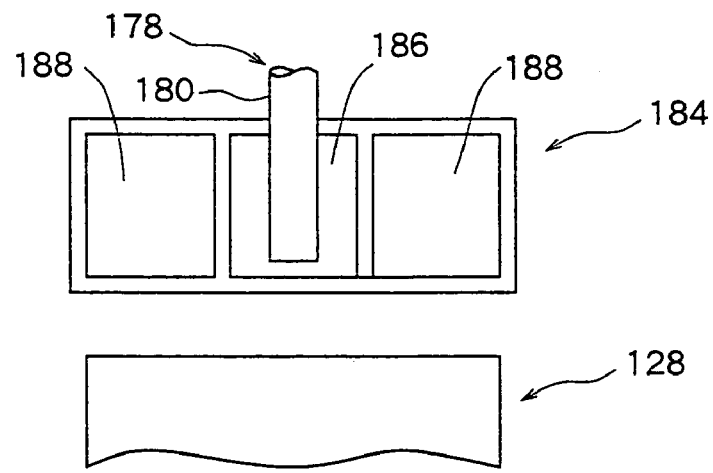
FIG. 6 is a side view showing modifications of the laser beam shining head and suction means.
Figure 7:
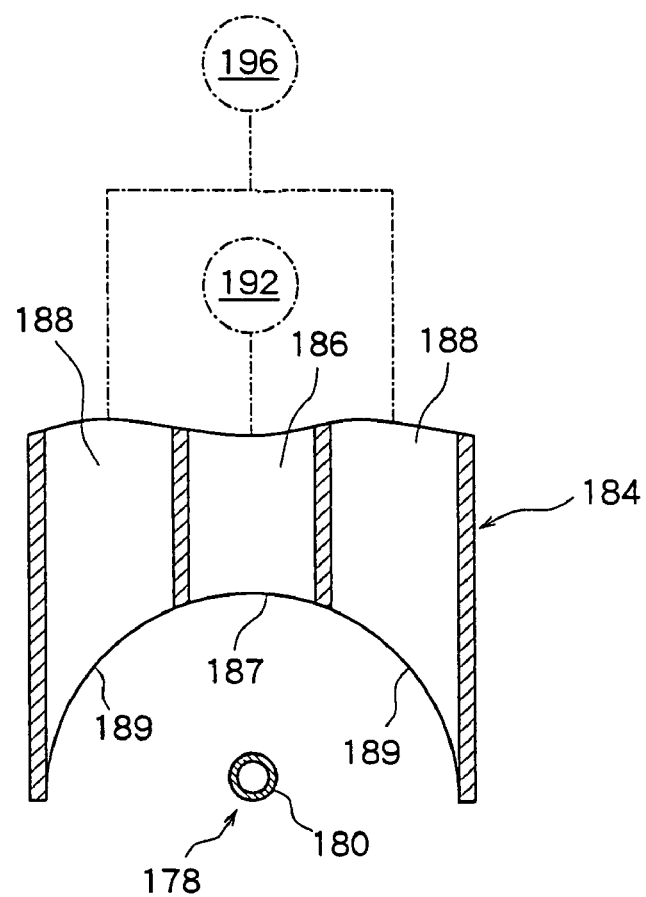
FIG. 7 is a cross-sectional view of the laser beam shining head and suction means of FIG. 6.

FIGS. 6 and 7 show modifications of the laser beam shining head and the suction means. A laser beam shining head 178 illustrated in FIGS. 6 and 7 includes laser beam shining means 180 located opposite a workpiece (not shown) held on holding means 128, but does not have an inert gas jetting nozzle (see the inert gas jetting nozzle 82 shown in FIG. 4). Suction means 184 includes a central hood 186 and outer hoods 188. The central hood 186 has a central suction opening 187 located unilaterally of the laser beam shining head 178, and the outer hoods 188 have outer suction openings 189 located bilaterally of the central suction opening 187. As will be clearly understood by reference to FIG. 7, the central suction opening 187, and the outer suction openings 189 located bilaterally of the central suction opening 187 extend arcuately continuously around the laser beam shining head 178. A central suction source 192, which may be a vacuum pump, is connected to the central hood 186. An outer suction source 196, which may be a vacuum pump, is connected to the outer hoods 188. Preferably, the suction force of the central suction source 192 is greater than the suction force of the outer suction source 196; therefore, a central portion of the machining region is sucked with a relatively great suction force, while a peripheral edge portion of the machining region is sucked with a relatively small suction force.

The preferred embodiments of the machining device according to the present invention have been described in detail in association with the removal of the low dielectric constant insulator laminated on the face of the semiconductor wafer 34. However, the machining device of the present invention can be preferably used in cutting the body of the semiconductor wafer 34 along the street 36 subsequently to the removal of the low dielectric constant insulator, or in cutting the semiconductor wafer 34, which has no low dielectric constant insulator applied to the face thereof, along the street 36.

The preferred embodiments of the machining device constructed in accordance with the present invention have been described in detail above with reference to the accompanying drawings. However, it should be understood that the present invention is not limited to these embodiments, and various modifications and corrections may be made without departing from the scope of the present invention.

The invention claimed is:

1. A machining device comprising:
   workpiece holding means for holding a workpiece;
   laser beam machining means for directing a laser beam on the workpiece held by said workpiece holding means to machine the workpiece;
   moving means for moving the workpiece held by said workpiece holding means, and a laser beam directed on the workpiece relative to each other; and
   suction means for sucking from a machining region where the laser beam is exposed to the workpiece, said suction means including a central hood, a central suction source for sucking through said central hood, an outer hood, and an outer suction source for sucking through said outer hood, wherein the suction force of said central suction source is greater than the suction force of said outer suction source.

2. The machining device according to claim 1, wherein said laser beam machining means includes a laser beam shining head located opposite the workpiece held by said workpiece holding means, said central hood surrounds said laser beam shining head, and said outer hood surrounds said central hood.

3. The machining device according to claim 2, wherein said laser beam shining head includes laser beam shining means for directing a laser beam on the workpiece held by said workpiece holding means, and an inert gas jetting nozzle surrounding said laser beam shining means.

4. The machining device according to claim 1, wherein said laser beam machining means includes a laser beam shining head located opposite the workpiece held by said workpiece holding means, said central hood has a central suction opening located unilaterally of said laser beam shining head, and said outer hood has outer suction openings located bilaterally of said central suction opening.

5. The machining device according to claim 4, wherein said central suction opening and said outer suction openings extend arcuately around said laser beam shining head.

* * * * *